(12) United States Patent
Augustyniak et al.

(10) Patent No.: US 8,899,000 B2
(45) Date of Patent: Dec. 2, 2014

(54) ARCHITECTURAL MEMBRANE AND METHOD OF MAKING SAME

(75) Inventors: Martin J. Augustyniak, Elma, NY (US); Thomas D. McCoy, West Falls, NY (US)

(73) Assignee: Birdair, Inc., Amherst, NY (US)

( * ) Notice: Subject to any disclaimer, the term of this patent is extended or adjusted under 35 U.S.C. 154(b) by 873 days.

(21) Appl. No.: 12/987,649

(22) Filed: Jan. 10, 2011

(65) Prior Publication Data

US 2012/0009834 A1 Jan. 12, 2012

Related U.S. Application Data

(60) Provisional application No. 61/363,119, filed on Jul. 9, 2010.

(51) Int. Cl.
*E04C 2/30* (2006.01)
*B32B 17/04* (2006.01)
*E04B 7/14* (2006.01)
*B32B 27/30* (2006.01)
*B32B 5/02* (2006.01)

(52) U.S. Cl.
CPC . *B32B 17/04* (2013.01); *E04B 7/14* (2013.01); *B32B 27/304* (2013.01); *B32B 5/02* (2013.01); *B32B 2255/02* (2013.01); *B32B 2262/0253* (2013.01)
USPC .............................. 52/783.1; 52/409; 52/800.1

(58) Field of Classification Search
USPC ............ 52/63, 783.1, 408–410, 782.1, 796.1, 52/800.1, 800.12, 631, 222, 406.1, 406.2, 52/309.1, 309.8; 442/85, 86, 88, 396–398, 442/417; 428/323, 332, 334, 421, 473.5, 428/522, 523
See application file for complete search history.

(56) References Cited

U.S. PATENT DOCUMENTS

| | | |
|---|---|---|
| 4,736,553 A | 4/1988 | Geiger |
| 5,103,600 A | 4/1992 | Geiger et al. |
| 5,261,193 A | 11/1993 | Wieber et al. |
| 5,394,786 A | 3/1995 | Gettle et al. |
| 5,430,979 A | 7/1995 | Wieber et al. |
| 5,502,928 A | 4/1996 | Terry |
| 5,667,165 A | 9/1997 | Gardner |
| 5,786,059 A | 7/1998 | Frank et al. |

(Continued)

FOREIGN PATENT DOCUMENTS

| | | |
|---|---|---|
| EP | 0368529 | 5/1990 |
| WO | WO2006135882 | 12/2006 |
| WO | WO2007047970 | 4/2007 |

OTHER PUBLICATIONS

Gossen, et al., The First Rigidly Clad "Tensegrity" Type Dome, The Crown Coliseum, Fayetteville, North Carolina, Spatial Structures in New Renovation Projects of Buildings and Construction, vol. II, Proceedings of International Congress IASS-ICSS, pp. 477-484 (1998).

*Primary Examiner* — Brian Glessner
*Assistant Examiner* — Beth Stephan
(74) *Attorney, Agent, or Firm* — Simpson & Simpson, PLLC

(57) ABSTRACT

An architectural membrane assembly including an interior membrane layer having a first inner surface, an exterior membrane layer having a second inner surface, an aerogel material disposed between the interior membrane layer and the exterior membrane layer, wherein the first and second inner surfaces are adjacent to the aerogel material and a vapor barrier deposited on one of the first and second inner surfaces.

6 Claims, 2 Drawing Sheets

(56) References Cited

U.S. PATENT DOCUMENTS

| | | |
|---|---|---|
| 5,789,075 A | 8/1998 | Frank |
| 6,282,842 B1 | 9/2001 | Simens |
| 6,598,283 B2 | 7/2003 | Rouanet et al. |
| 6,709,600 B2 | 3/2004 | Hrubesh et al. |
| 6,887,563 B2 | 5/2005 | Frank et al. |
| 7,153,792 B2 | 12/2006 | Sahlin et al. |
| 2001/0034375 A1 | 10/2001 | Schwertfeger |
| 2002/0020132 A1* | 2/2002 | Mitchell ............... 52/631 |
| 2002/0069904 A1 | 6/2002 | Robinson |
| 2004/0074152 A1* | 4/2004 | Rogers et al. ............ 52/3 |
| 2004/0177590 A1* | 9/2004 | Nudo et al. ............ 52/783.1 |
| 2005/0046086 A1 | 3/2005 | Lee et al. |
| 2005/0167891 A1 | 8/2005 | Lee et al. |
| 2006/0021643 A1 | 2/2006 | Brensinger |
| 2006/0141223 A1 | 6/2006 | Oles et al. |
| 2006/0272727 A1 | 12/2006 | Dinon |
| 2007/0004306 A1 | 1/2007 | Leeser et al. |
| 2008/0174147 A1* | 7/2008 | Skaradzinski ............ 296/181.3 |

\* cited by examiner

ARCHITECTURAL MEMBRANE AND METHOD OF MAKING SAME

CROSS-REFERENCE TO RELATED APPLICATIONS

This patent application claims the benefit under 35 U.S.C. §119(e) of U.S. Provisional Patent Application No. 61/363,119, filed Jul. 9, 2010, which application is incorporated herein by reference.

FIELD OF THE INVENTION

The invention broadly relates to architectural membranes, more specifically to an architectural membrane comprising an insulation blanket structure held between opposing membrane layers wherein one of the membrane layers includes a vapor barrier, and also broadly relates to a method of making the same.

BACKGROUND OF THE INVENTION

Conventional construction techniques have been expanded to include architectural membranes which permit the creation of unique, free flowing or domed structures. Such structures include stadiums, airports, convention centers and the like. Architectural membranes, also known as tensile or tensioned structures, are increasingly used in buildings, storage facilities, arenas, activity centers, sports/gathering venues, domes, museums, housing and so forth. The foregoing architectural membranes may be used to form walls, ceilings, roofs, etc., thereby providing a versatile and functional construction material.

An example of an architectural membrane is described in U.S. patent application Ser. No. 12/052,931 filed on Mar. 21, 2008, and entitled Architectural Membrane Structures and Methods for Producing Them, which application is incorporated herein by reference in its entirety. In that application, an architectural membrane comprising first and second layers having an aerogel blanket arranged therebetween is described.

It has been recognized that various performance characteristics of the foregoing architectural membranes, including architectural membranes comprising insulation layers, may change over the course of time. The membranes may discolor, decrease in translucency, increase in mass, heat transfer values may change (effecting thermal insulation characteristics), etc. Such degradation can shorten the lifespan of the membrane structures and reduce their effectiveness as a construction material.

As can be derived from the variety of architectural membranes, many means have been contemplated to accomplish the desired end, i.e., structural integrity, aesthetic appeal and environmental control. Heretofore, tradeoffs between aesthetics and performance were required. Thus, there is a long-felt need for an architectural membrane which can withstand extreme environmental conditions while maintaining aesthetic appearance and structural integrity.

BRIEF SUMMARY OF THE INVENTION

The present invention minimizes the issues described supra, by for example, preventing migration of water vapor from one side of an architectural membrane to the opposite side. Broadly, the foregoing is accomplished by coating one of the two membranes which form the architectural membrane structure with a vapor impermeable material.

The present invention broadly comprises an architectural membrane assembly including an interior membrane layer having a first inner surface, an exterior membrane layer having a second inner surface, an aerogel material disposed between the interior membrane layer and the exterior membrane layer, wherein the first and second inner surfaces are adjacent to the aerogel material and a vapor barrier deposited on one of the first and second inner surfaces.

In some embodiments, the aerogel material is a blanket including a fiber web and aerogel particulates substantially homogenously disbursed therein. In some of those embodiments, the aerogel material is a plurality of the blankets. In some embodiments, at least one of the interior and exterior membrane layers comprises fiberglass, polyester, metal mesh, fibrous batting or a combination thereof. In some embodiments, at least one of the interior and exterior membrane layers is coated with polytetrafluoroethylene, vinyl, polyvinyl chloride (PVC), polyvinylidene fluoride (PVDF), polyvinyl fluoride (PVF a/k/a Tedlar®), acrylic, silicone, titanium dioxide or combinations thereof. In some embodiments, the vapor barrier includes a coating selected from the group consisting of: fluorinated ethylene propylene, polyethylene, perfluoroalkoxy copolymer resin, polyimide, polyvinylidene chloride, polychlorotrifluoroethylene, polyvinylidene fluoride, polyvinyl fluoride and ethylene tetrafluoroethylene and combinations thereof, and in some of those embodiments, the coating has a thickness of at least five mil.

In a further embodiment, the present invention broadly comprises an architectural membrane structure including an interior membrane layer having a first inner surface, an exterior membrane layer having a second inner surface, a plurality of insulation blankets having an aerogel material, each of the plurality of insulation blankets includes an edge and is disposed between the interior membrane layer and the exterior membrane layer, wherein the first and second inner surfaces are adjacent to the plurality of insulation blankets, a first heat shield arranged adjacent to the edge of each of the plurality of insulation blankets, a second heat shield arranged between the plurality of insulation blankets and the exterior membrane layer, an edge enclosure arranged about the first heat shield, the second heat shield and the plurality of insulation blankets, an anchoring strip arranged between the plurality of insulation blankets and the exterior membrane layer, a third heat shield arranged between the anchoring strip and the exterior membrane layer, a retainer strip arranged between the plurality of insulation blankets and the second heat shield and about the second heat shield, the edge enclosure, the anchoring strip, and the third heat shield, at least one fastener disposed through the retainer strip, the third heat shield, the anchoring strip, the edge enclosure, the second heat shield and the plurality of insulation blankets, and a vapor barrier deposited on one of the first and second inner surfaces.

In some embodiments, the first and second heat shields are integral. In some embodiments, the combination of the exterior membrane layer, the anchoring strip and the interior membrane layer form an edge seal. In some embodiments, a terminal end of the edge seal distal from the plurality of insulation blankets includes a cord or a cable. In some embodiments, the vapor barrier includes a coating selected from the group consisting of: fluorinated ethylene propylene, polyethylene, perfluoroalkoxy copolymer resin, polyimide, polyvinylidene chloride, polychlorotrifluoroethylene, polyvinylidene fluoride, polyvinyl fluoride and ethylene tetrafluoroethylene and combinations thereof, and in some of those embodiments, the coating has a thickness of at least five mil.

It is a general object of the present invention to provide an architectural membrane which includes an integral vapor barrier.

It is another general object of the present invention to provide an architectural membrane structure which includes a means for tensioning the membrane structure.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
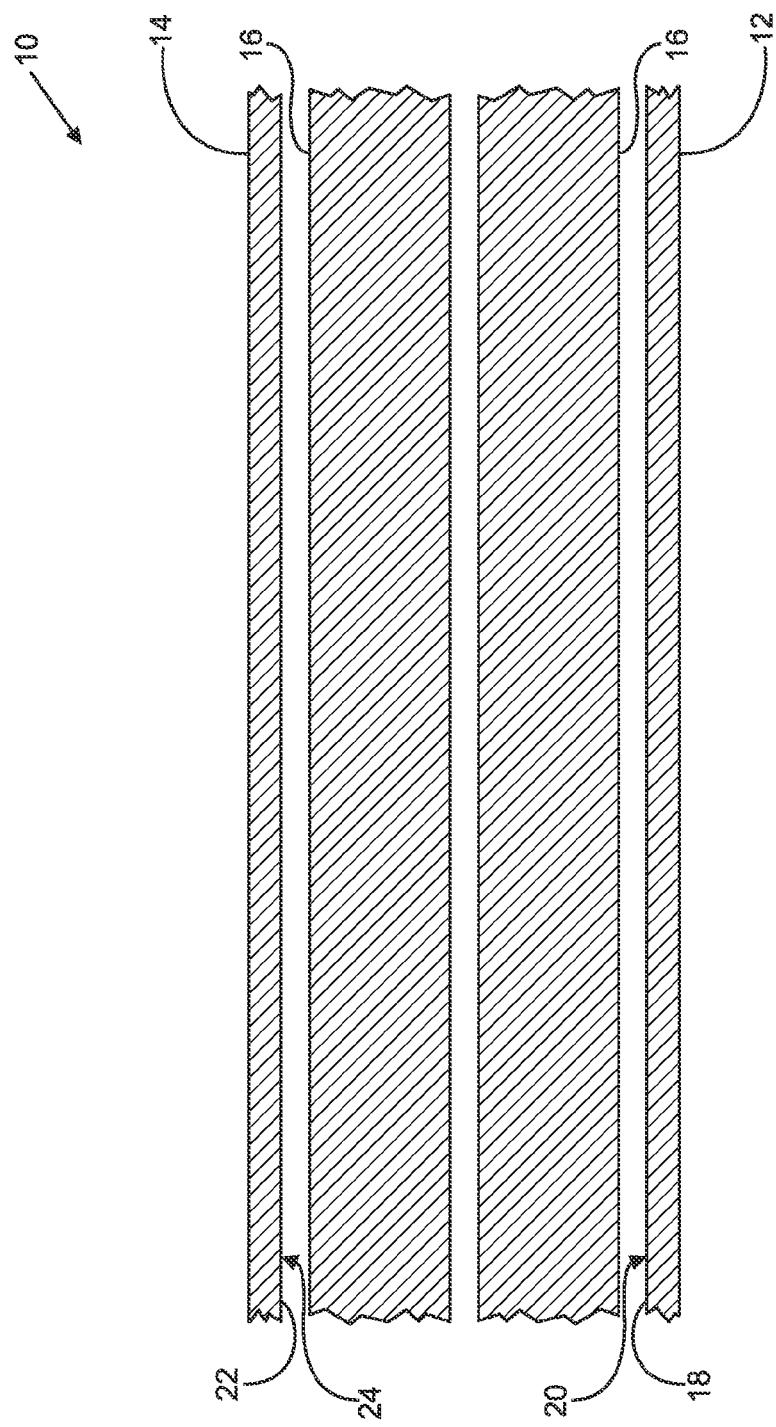
FIG. 1 is a cross sectional view of a present invention architectural membrane assembly; and, FIG. 2 is a perspective cross sectional view of a present invention architectural membrane structure.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described. It should be appreciated that nanogel and aerogel are used interchangeably within this application, and are intended to mean the same or similar type of insulating element.

Some structures employing architectural membranes experience extreme environmental conditions such as high humidity or large differentials between interior and exterior temperatures. High humidity conditions are common in structures housing pools, while large temperature differentials are common in areas having relatively high or low temperature extremes, e.g., Dubai, United Arab Emirates (UAE) (high temperatures) or Buffalo, N.Y. (low temperatures). In such extreme environments, it is possible to have relative humidity differentials greater than 50% and temperature differentials greater than 70 degrees Fahrenheit, and a variety of issues may arise, e.g., condensation buildup on the "cold side" of the architectural membrane. It has been recognized that such issues are exacerbated in the foregoing extreme environments.

Architectural membranes may be generally porous, i.e., both the exterior membranes and the insulation materials have a level of porosity. Although liquid does not pass through such membranes, water vapor may pass from one side of the architectural membrane to the other side. The temperature and humidity differentials described above are in part responsible for causing the water vapor to pass from one side to the other. This may cause a variety of problems such as an increase in the overall mass of the membrane structure, or the growth of bacteria or microbes within the membrane. The increase in mass is believed to result from the presence of water within the membrane which can in turn affect thermal coefficient values, and the growth of bacteria and microbes can result in discoloration and/or deterioration of the membrane.

Architectural membrane structure 10 comprises interior membrane layer 12 and exterior membrane layer 14 having at least one insulation blanket 16, e.g., an aerogel blanket, arranged therebetween. Although the embodiment shown in FIG. 1 comprises two insulation blankets 16, it should be appreciated that a single insulation blanket may be arranged between membrane layers 12 and 14, or alternatively, more than two insulation blankets may be arranged therein, e.g., five insulation blankets, and such variations are within the spirit and scope of the claimed invention. Furthermore, it should be appreciated that although the present invention is described as comprising insulation blankets, other intermediate layers may also be used, such as particulate insulation material or monolithic insulation forms.

The assembly of interior membrane layer 12 and exterior membrane layer 14 (collectively referred to as "outer layers"), in combination with insulation blankets 16, can be formed in a variety of thicknesses, e.g., about 0.10 millimeters (mm) to about 60 mm, and preferably between 22 mm and 40 mm. Membrane layer 14 may be formed from woven or non-woven materials. Such materials can include but are not limited to fiberglass, mesh materials, e.g., metal mesh, fibrous batting, aramids, olefins, nylon, acrylics, polyester, natural fibers such as cotton, halopolymers such as polytetrafluoroethylene (PTFE a/k/a Teflon®), and combinations thereof. Moreover, foils such as those manufactured from ethylene tetrafluoroethylene (ETFE a/k/a Tefzel®) can be used. Whether formed from a woven or non-woven material, the outer layers can be coated with PTFE, vinyl such as polyvinyl chloride (PVC), silicone, urethanes, acrylics, titanium dioxide ($TiO_2$), or combinations thereof. The coating can be applied by painting, dipping, spraying, vapor deposition techniques, lamination or other processes known in the art.

In one embodiment, at least one and preferably both outer layers are fabricated from Sheerfill® membrane materials available from Saint-Gobain Corporation. Other commercially available PTFE-coated fiberglass membranes that can be used include Solus® membranes from Taconic International Ltd., Duraskin® from Verseidag Seemee US Inc. or PTFE-coated fiberglass membranes from Chukoh Chemical Industries LTD. Also suitable are expanded woven PTFE (ePTFE) membranes such as those known under the tradename of Tenara® from W. L. Gore Assoc. Inc and from Sefar AG.

Commercially available silicone-coated fiberglass membranes that can be utilized include Archifab® from Fabrimax, Atex® from Interglas and Sky® 300 from Ferrari Textiles. Silicone-coated polyester membranes are those being developed by PD Interglas. Solution-dyed polyester membranes are commercially available as Weatherman FR® by Safety Components Fabric Technologies Inc or Fireset HUV® from Glen Raven Custom Fabrics L.L.C. Olefin-based membranes include those known under the name of Nova-Shield® by Engineered Coated Products, Twillium® by Inter Wrap and Landmark® by Synthesis Fabrics. Examples of olefin open weave lock-knit mesh include Polytex® from Solarfab Inc.

and Coolaroo® from Gale Pacific. Woven polyvinylidene fluoride (PVDF) is commercially available from Duckers & Friends under the designation of Fugalux®. Commercially available acrylic-coated polyesters that can be employed to form the first and/or second layers include Main Street® from John Boyle, Avenue® from Graniteville Specialty Fabrics and Holiday® from Marchem coated Fabrics Inc. Photovoltaic membranes such as Power-Film® from PowerFilm Inc. and Power Plastics® from Konarka Technologies can also be used.

One or both outer layers also can be made from other materials that are flexible and preferably strong enough for architectural tensile membrane applications. Optionally, either or both outer layers is/are coated with an ultraviolet (UV) reflecting film, a dye or scratch-resistant film or another suitable coating. If additional outer layers and/or interior layers are employed, they can be fabricated from materials such as those disclosed herein or from other suitable materials.

Arrangements using an insert secured, e.g., by adhesion, to one layer also can be employed. For instance, an architectural membrane structure can consist of a single layer lined by the insert or can include a layer having the insert secured to it. In many implementations of the invention, the architectural membrane structure includes aerogel or another porous, preferably nanoporous, material. In some examples, the material can be provided as a liner to one or both outer layers. In preferred embodiments, the material is present in the insert layer which can consist, consist essentially of or can comprise aerogel and/or another porous material.

Aerogels are low density porous solids that have a large intraparticle pore volume. Generally, they are produced by removing pore liquid from a wet gel. However, the drying process can be complicated by capillary forces in the gel pores, which can give rise to gel shrinkage or densification. In one manufacturing approach, collapse of the three dimensional structure is essentially eliminated by using supercritical drying. A wet gel also can be dried using an ambient pressure, also referred to as non-supercritical drying process. When applied, for instance, to a silica-based wet gel, surface modification, e.g., end-capping, carried out prior to drying, prevents permanent shrinkage in the dried product. The gel can still shrink during drying but springs back recovering its former porosity. A product referred to as "xerogel" also is obtained from wet gels from which the liquid has been removed. The term often designates a dry gel compressed by capillary forces during drying, characterized by permanent changes and collapse of the solid phase network. For convenience, the term "aerogel" is used herein in a general sense, referring to both "aerogels" and "xerogels".

Aerogels typically have low bulk densities (about 0.15 g/cm$^3$ or less, preferably about 0.03 to 0.3 g/cm$^3$), very high surface areas (generally from about 300 to about 1,000 square meter per gram (m$^2$/g) and higher, preferably from about 600 to about 1000 m$^2$/g), high porosity (about 90% and greater, preferably greater than about 95%), and a relatively large pore volume volume (about 3 milliliter per gram (mL/g), preferably about 3.5 mL/g and higher). Aerogels can have a nanoporous structure with pores smaller than 1 micron (μm). Often, aerogels have a mean pore diameter of about 20 nanometers (nm). The combination of these properties in an amorphous structure gives low thermal conductivity values (e.g., 9 to 16 (mW)/mK at a mean temperature of 37° C. and 1 atmosphere of pressure). Aerogels can be nearly transparent or translucent, scattering blue light, or can be opaque.

A common type of aerogel is silica-based. Aerogels based on oxides of metals other than silicon, e.g., aluminum, zirconium, titanium, hafnium, vanadium, yttrium and others, or mixtures thereof can be utilized as well. Also known are organic aerogels, e.g., resorcinol or melamine combined with formaldehyde, dendredic polymers, and so forth, and the invention also could be practiced using these materials. Suitable aerogel materials and processes for their preparation are described, for example, in United States Patent Application No. 2001/0034375 to Schwertfeger et al., published on Oct. 25, 2001, the teachings of which are incorporated herein by reference in their entirety.

The aerogel material employed can be hydrophobic. As used herein, the terms "hydrophobic" and "hydrophobized" refer to partially as well as to completely hydrophobized aerogel. The hydrophobicity of a partially hydrophobized aerogel can be further increased. In completely hydrophobized aerogels, a maximum degree of coverage is reached and essentially all chemically attainable groups are modified. Hydrophobicity can be determined by methods known in the art, such as, for example, contact angle measurements or by methanol (MeOH) wettability. A discussion of hydrophobicity in relation to aerogels is found in U.S. Pat. No. 6,709,600 issued to Hrubesh et al. on Mar. 23, 2004, the teachings of which are incorporated herein by reference in their entirety. Hydrophobic aerogels can be produced by using hydrophobizing agents, e.g., silylating agents, halogen- and in particular fluorine-containing compounds such as fluorine-containing alkoxysilanes or alkoxysiloxanes, e.g., trifluoropropyltrimethoxysilane (TFPTMOS), and other hydrophobizing compounds known in the art. Hydrophobizing agents can be used during the formation of aerogels and/or in subsequent processing steps, e.g., surface treatment. Silylating compounds such as, for instance, silanes, halosilanes, haloalkylsilanes, alkoxysilanes, alkoxyalkylsilanes, alkoxyhalosilanes, disiloxanes, disilazanes and others are preferred. Examples of suitable silylating agents include, but are not limited to diethyldichlorosilane, allylmethyldichlorosilane, ethylphenyldichlorosilane, phenylethyldiethoxysilane, trimethylalkoxysilanes, e.g., trimethylbutoxysilane, 3,3,3-trifluoropropylmethyldichlorosilane, symdiphenyltetramethyldisiloxane, trivinyltrimethylcyclotrisiloxane, hexaethyldisiloxane, pentylmethyldichlorosilane, divinyldipropoxysilane, vinyldimethylchlorosilane, vinylmethyldichlorosilane, vinyldimethylmethoxysilane, trimethylchlorosilane, hexamethyldisiloxane, hexenylmethyldichlorosilane, hexenyldimethylchlorosilane, dimethylchlorosilane, dimethyldichorosilane, mercaptopropylmethyldimethoxysilane, bis{3-(triethoxysilyl) propyl}tetrasulfide, hexamethyldisilazane and combinations thereof.

The aerogel can be in granular, pellet, bead, powder, or other particulate form and in any particle size suitable for an intended application. For instance, the particles can be within the range of from about 0.01 microns (μm) to about 10.0 millimeters (mm) and preferably have a mean particle size in the range of 0.3 to 4.0 mm. Examples of commercially available aerogel materials in particulate form are those supplied under the tradename of Nanogel® by Cabot Corporation, Billerica, Mass. Nanogel® granules have high surface area, are greater than about 90% porous and are available in a particle size ranging, for instance, from about 8 μm to about 10 mm.

Aerogel also can be produced in composite form, for instance as a rigid, semi-rigid, semi-flexible or flexible structure, e.g., mat shaped composites that include fibers. Flexible or semi-flexible composites are preferred for use in the insert described herein. Whether in particulate or composite sheet/blanket, the aerogel can include one or more additives such as fibers, opacifiers, color pigments, dyes and mixtures thereof. For instance, a silica aerogel can be prepared to contain additives such fibers and/or one or more metals or compounds thereof. Specific examples include aluminum, tin, titanium, zirconium or other non-siliceous metals and oxides thereof. Non-limiting examples of opacifiers include carbon black, titanium dioxide, zirconium silicate and mixtures thereof. Additives can be provided in any suitable amounts, e.g., depending on desired properties and/or specific application.

Composite materials that include fibers and aerogel (e.g., fiber-reinforced aerogels) and, optionally, at least one binder may also be employed. The fibers can have any suitable structure. For example, the fibers can have no structure (e.g., unassociated fibers), or the the fibers can have a matrix structure or similar mat-like structure which can be patterned or irregular and random. Preferred composites of materials comprising fibers include composites formed from aerogels and fibers wherein the fibers have the form of a lofty fibrous structure, batting or a form resembling a steel wool pad. Examples of materials suitable for use in the preparation of the lofty fibrous structure include fiberglass, organic polymeric fibers, silica fibers, quartz fibers, organic resin-based fibers, carbon fibers and the like. The material having a lofty fibrous structure can be used by itself or in combination with a second, open-cell material, e.g., an aerogel material. For instance, a blanket can have a silica aerogel dispersed within a material having a lofty fibrous structure.

The present invention may use aerogel-based inserts such as fiber-web/aerogel composites that include bicomponent fibers, for example, as disclosed in U.S. Pat. No. 5,786,059 issued on Jul. 28, 1998 to Frank et al., the teachings of which are incorporated herein by reference in their entirety. Such composites use at least one layer of fiber web and aerogel particles, wherein the fiber web comprises at least one bicomponent fiber material, the bicomponent fiber material having lower and higher melting regions and the fibers of the web being bonded not only to the aerogel particles but also to each other by the lower melting regions of the fiber material. In some applications, the bicomponent fibers are manufactured fibers which are composed of two firmly interconnected polymers of different chemical and/or physical constructions and which have regions having different melting points, i.e., lower and higher melting regions.

As described in the above-referenced patent, the bicomponent fibers can have a core-sheath structure. The core of the fiber is a polymer, preferably a thermoplastic polymer, whose melting point is higher than that of the thermoplastic polymer which forms the sheath. The bicomponent fibers are preferably polyester/copolyester bicomponent fibers. It is also possible to use bicomponent fiber variations composed of polyester/polyolefin, e.g., polyester/polyethylene, or polyester/copolyolefin or bicomponent fibers having an elastic sheath polymer. Side-by-side bicomponent fibers also can be employed.

The fiber web may further comprise at least one simple fiber material which becomes bonded to the lower melting regions of the bicomponent fibers in the course of thermal consolidation. The simple fibers are organic polymer fibers, for example polyester, polyolefin and/or polyamide fibers, preferably polyester fibers. The fibers can be round, trilobal, pentalobal, octalobal, ribbony, like a Christmas tree, dumbbell-shaped or otherwise star-shaped in cross section. It is similarly possible to use hollow fibers. The melting point of these simple fibers should be above that of the lower melting regions of the bicomponent fibers.

In further specific examples, the insert layer is in the form of an aerogel sheet or blanket. The sheet or blanket can include, for instance, aerogel particles dispersed in fibers. In other cases, the sheet or blanket includes fibrous batting with continuous or substantially homogenously disbursed aerogel throughout. Sheets or blankets can be produced, for instance, from wet gel structures as described in United States Patent Application Publication Nos. 2005/0046086 published on Mar. 3, 2005 and 2005/0167891 published on Aug. 4, 2005, both to Lee et al., the teachings of which are incorporated herein by reference in their entirety.

Optionally, the material employed to form the insert layer or insert, e.g., loose aerogel particles or another granular material, can be enclosed in a film or casing made of one or more polymers such as nylon, polycarbonate, metal sheets, or other suitable materials, forming a pillow, mat, bag, and the like. The material also can be present in layers.

The insert layer is sized and shaped to meet construction and design specifications. In illustrative examples, the insert has a thickness of about 0.125 inches or greater. Preferably, the insert has a thickness within the range of from about 25 mm to about 200 mm.

An insert layer that is an insulator is preferred. As used herein, the term "insulating" or "insulator" refers to thermal, acoustic or electric insulating properties. In preferred implementations, the insert combines two or more types of insulating properties. In one example, the insert is a thermal insulator. In many implementations, the insert has an R-value of at least 2, more preferably between 3 and 38. "R value" is a parameter well known in describing construction materials and is a measure of thermal resistance to heat flow. In another example the insert layer has a substantially constant thermal conductivity (k-value), within the range of from about 12 to about 30 (mW)/mK at 37° C. and 1 atmosphere of pressure. Also preferred are inserts for which the thermal conductivity or k-value of the insert remains constant, or preferably decreases with load or compression. In a further example, the insert is an acoustic insulator. Nanogel® aerogel particles, for instance, slow down the speed of sound through the structure, reducing noise, in particular in the low to mid frequency range from 40 to 500 Hz. In yet another example the insert is an electrical insulator. Hydrophobic inserts are preferred. More preferred are water and mold resistant inserts. Suitable inserts may also have fire resistant or fire-proof properties.

In some embodiments, loose granular material is used in conjunction with a binder material between the layers. The layers can either tightly enclose the material or can loosely enclose the material. In loose enclosures, the layers can be held apart by air in a pillow-like form. In this case, the insert material can completely fill the inner pillow region or could partially fill the region, being affixed to one or more of the outer layers by an optional binder. Other suitable approaches can be employed to incorporate granular materials in air-supported structures, e.g., pillows or cushions. Furthermore, air-supported cushion or pillow structures can be formed utilizing monolithic and/or composite materials, e.g., aerogel blankets and the like. To reduce or minimize settling and the formation of voids, the space or gap volume between the outer layers can be "overfilled" or "overpacked". Overpacked systems can have a density at least as high as the tap density. For aerogel particles, overfilling is to a density higher than the tap density. In systems filled with aerogel particles that are very light compared to a relatively heavy frame, the density can be considerably greater than the tap density, for instance about 105 to about 115%-120% and higher of tap density.

In accordance with the present invention, a vapor barrier layer is added to one of the outer layers. In a preferred embodiment, the vapor barrier layer is added to the outer layer which is exposed to the higher temperature, e.g., in a cold environment such as Buffalo, N.Y. vapor barrier layer 18 is added to surface 20 of interior membrane layer 12 which surface is adjacent to aerogel blanket 16. In the alternative, if the present invention architectural membrane is used in a hot environment such as Dubai, vapor barrier layer 22 is added to surface 24 of exterior membrane layer 14 which surface is adjacent to aerogel blanket 16. Having such an arrangement, it has been found that vapor propagation from one side of the architectural membrane structure to the other side is minimized or prevented entirely.

Figure 2:
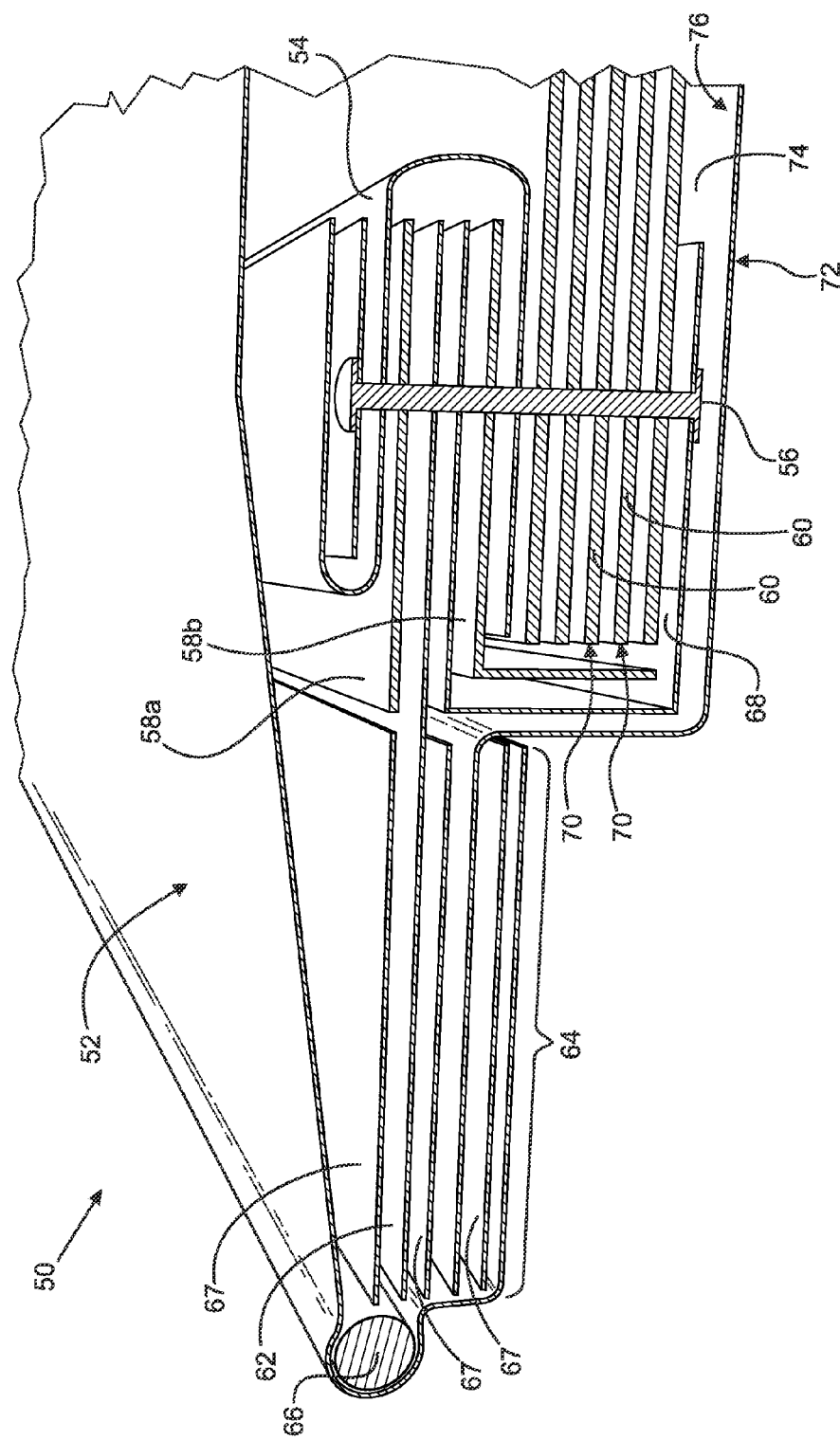

Another embodiment of the present invention is shown in FIG. 2. Architectural membrane structure 50 comprises outer membrane layer 52. Membrane layer 52 may be selected from the membrane materials described above, e.g., a PTFE membrane such as Sheerfill® fabric. Sheerfill® fabric. Membrane layer 52 forms the main structural membrane element of membrane structure 50. Membrane layer 52 is typically water impermeable; however, vapor permeability may be present depending on the environmental or climatic conditions as described supra. Membrane structure 50 further comprises retainer strip 54. Retainer strip 54 is a cover strip adapted to protect fastener 56 from ultra-violet (UV) exposure and to prevent heat shield 58a from migrating or moving. Retainer strip 54 is preferably fabricated from a flexible material which is compatible with the surrounding materials, e.g., fluorinated ethylene propylene (FEP) tape. Fastener 56 is used as an edge attachment fastener which connects the interior components into a single assembly. Preferably, fastener 56 is UV resistant, flexible, compatible with surrounding materials and of sufficient strength to withstand the forces present within a fully tensioned membrane structure 50. In some embodiments, fastener 56 may be formed from nylon.

Membrane structure 50 further comprises heat shield material 58a and 58b which provides heat protection for insulation blankets 60. Heat shields 58a and 58b are positioned as needed to permit heat sealing during installation on adjacent layers and to permit heat sealing of the structural perimeter during the manufacturing process describes infra. In a preferred embodiment, shields 58a and 58b are flexible, thin and compatible with the surrounding materials. An example of a suitable heat shield material is a ceramic fiber blanket/sheet formed from alumina-silica materials and sold under the trade name Fiberfrax®. Membrane structure 50 further comprises anchoring strip 62 which is positioned such that strip 62 anchors insulation blankets 60 to the structural perimeter, i.e., edge seal 64 having cord 66 at a terminal position. It should be appreciated that cord 66 may be any cord material known in the art, e.g., ethylene propylene diene monomer (EPDM) or steel cable. Moreover, edge seal 64 may further comprise intermediate layers 67 positioned to provide additional interlayer adhesion during sealing, e.g., FEP tape used in conjunction with heat sealing operations. Membrane structure 50 further comprises edge closure 68 arranged as a C-shaped insulation cover. Edge closure 68 encloses, contains and supports the insulation blanket assembly edges, i.e., edges 70 of insulation blankets 60. Edge closure 68 may be formed from a variety of materials, for example, Fabrasorb® fabric, a composite membrane comprising fiberglass and PTFE.

Membrane structure 50 further comprises insulation blankets 60. It should be appreciated that although five insulation blankets 60 are shown in FIG. 2, other embodiments are also possible, e.g., two insulation blankets 60, and such variations are within the spirit and scope of the claimed invention. In a preferred embodiment, each respective insulation blanket is thin, semi-translucent, has a high thermal insulation value, is vapor permeable, hydrophobic and acoustically absorbent. An example of such an insulation blanket material suitable for the present invention is the Nanogel® blanket described supra. Such materials have high retention of aerogel particles, even under vibration. Membrane structure 50 yet further comprises liner layer 72 arranged as an inner system skin which may be either structural or non-structural in form. Layer 72 provides structural support for insulation blankets 60 and may further provide a secondary structural membrane element for membrane structure 50. In a preferred embodiment, layer 72 has moderate light transmission, allows sound/acoustic transmission, has moderate to high light reflectance, and may be vapor semi-permeable. In view of the extreme environmental/climatic conditions described above, liner layer 72 may further comprise vapor barrier layer 74 arranged to preclude the transmission of vapor through liner layer 72, i.e., making layer 72 vapor impermeable. In a preferred embodiment vapor barrier 74 is translucent, UV stable, heat tolerant (necessary for manufacturing, installation and heat sealing) and has extremely low vapor permeability. An example of such a vapor barrier is a FEP coating or layer laminated or deposited on inner surface 76 of liner layer 72. It should be appreciated that the foregoing vapor barrier layer may be formed on the inner surface of either liner layer 72 or membrane layer 52, and such selection is based on which layer will be more often exposed to higher temperatures, e.g., layer 52 for installation in high temperature environments and layer 72 for installations in low temperature environments. Having the foregoing arrangement, membrane structure 50 is permitted to breath, thereby minimizing trapping of vapor within membrane structure 50. Additional examples of suitable vapor barrier materials include but are not limited to polyethylene, perfluoroalkoxy (PFA) copolymer resins such as Teflon® PFA, polyimide (e.g., Kapton® from DuPont), polyvinylidene chloride (PVDC) (e.g., Saran™ from Dow Chemical), polychlorotrifluoroethylene (PCTFE) (e.g., Aclar® from Honeywell), polyvinylidene fluoride (PVDF), polyvinyl fluoride (PVF) (e.g., Tedlar® from DuPont) and ethylene tetrafluoroethylene (ETFE) and combinations thereof.

The following procedure is an embodiment of a method used to manufacture the present invention architectural membrane structure, e.g., membrane structure 50. The inner liner layer templates each comprising, for example, PTFE coated woven fiberglass material with an extra pass of PTFE and laminated with 5 mil FEP (approximately equivalent to 0.127 millimeters) to act as vapor barrier are positioned on a work surface. The liner layer templates are patterned and compensated to allow for stretch to be taken out during the tensioning process, i.e., during assembly of the structure using the present invention membrane material such as a roof. Such compensation is determined by a biaxial test which is well known in the art. In a preferred method, the liner layer templates material is provided in four feet widths, although wider widths may also be used. Subsequently the liner layer templates are cut using a computerized cut table, heat welded together to form a final assembly and lastly indexed for final membrane assembly.

Next, aerogel blankets comprising polyethylene fibers carrying particulate aerogel material uniformly distributed therethrough are placed on a work surface. The aerogel blankets are patterned and compensated to allow for stretch to be taken out during the tensioning process. Again, the compensation is determined by a known biaxial test. In a preferred method, the aerogel blankets are provided in twenty-two inch widths, although wider widths may also be used. The aerogel blankets are then butt sewn with a cross stitch to form an assembly template, the assembly template is mechanically cut to a predetermined size and the cut aerogel blankets are then indexed for final membrane structure assembly.

A structural outer template membrane comprising, for example, PTFE coated woven fiberglass material, is placed on a work surface. The structural outer template membranes are patterned and compensated to allow for stretch to be taken out during the tensioning process, which compensation is again determined by a known biaxial test. The structural outer template membranes are provided in twelve feet widths and cut on a computerized cut table, although it should be appreciated that other widths are also possible. The structural outer template membranes are heat welded together to form a final assembly and indexed for final membrane structure assembly.

After the preliminary steps have been completed, the structural outer membrane assembly is laid out in a membrane assembly area, i.e., a clean room. Next a retainer strip is laid out at the perimeter of structural outer membrane assembly, followed by a first layer of heat shield material positioned on the retainer strip and an anchoring strip subsequently positioned thereon. Next an edge enclosure is laid out at the perimeter, followed by a second layer of heat shield laid out thereon. The retainer strip is folded over to encapsulate the heat shield material, anchoring strip and edge enclosure.

A first aerogel assembly template is laid out over the structural outer membrane assembly with index marks from each respective element aligned. Then, second, third, fourth and fifth aerogel assembly templates are sequentially laid out over the previous aerogel assembly template with its respective index marks aligned. A vertically oriented heat shield is positioned about the outer edges of the aerogel assembly templates and the edge enclosure is folded over to encapsulate the aerogel blankets, second layer of heat shield material, vertical heat shield material and the lower retainer strip. Next the structural outer membrane assembly is folded back to provide access to the other materials. Fasteners are inserted at the retainer strip through the first layer of heat shield material, anchoring strip, top side of the edge enclosure, second layer of heat shield material, lower retainer strip, layers of aerogel blanket and lower edge enclosure. The upper retainer strip is folded over to encapsulate the fastener heads. Next, the structural outer membrane assembly is unfolded. The inner liner layer assembly is laid out on the foregoing elements and its index marks aligned, the cord edge is inserted and the structural outer membrane assembly is re-folded. Lastly, the edge heat seal is completed for the entire perimeter using methods known in the art.

It should be appreciated that the foregoing process is not intended to limit the scope of the invention to require all of the recited steps, and as such, the method of manufacturing the present invention membrane structure may include only a portion of the foregoing steps, or may include additional steps.

The following data was obtained by testing samples of the present invention membrane structure in accordance with the procedures described below.

Material Test #1

Testing was conducted in a refrigerated transport trailer with a 2.337 meter×2.261 meter (7 feet 8 inch×7 feet 5 inch) sample of the present invention membrane layer structure installed into a 7 feet×7 feet wood frame using 6 inches×6 inches lumber. The membrane panel consisted of an outer layer of Sheerfill® II HT (with $TiO_2$ Everclean coating deposited thereon), five layers of 8 millimeter (second generation) Nanogel® blanket insulation, and an interior layer of Fabrasorb® 1A laminated with 5 mil fluorinated ethylene propylene (FEP) using a double dip coating technique, which technique is known in the art.

The panel was tightly stretched onto the frame and held in place with bolted anchor plates. It should be noted that the panel frame was constructed approximately 150 millimeters (6 inches) smaller than the interior trailer dimensions to facilitate installation and handling. Once the panel was installed, the remaining space between the frame and interior trailer wall was framed with plywood to provide structural support to the panel. The framing was then insulated with five layers of Nanogel for continuity of the thermal barrier. To construct the air seal between the panel and trailer walls, polyethylene sheet was installed around the perimeter of the panel and held between the wood frame and the roof panel by a clamping system. The polyethylene was wrapped over the insulated framing and sealed to the interior trailer walls using cold weather duct tape.

Testing was conducted with a temperature of −25° C. (−13° F.) on the cold side and 20° C. (68° F.) on the warm side. The A/C unit on the trailer was used to condition the cold side of the trailer. A small heater and humidifier were installed on the warm side of the chamber for control but the ambient temperature and relative humidity was such that these units were not needed. The warm side humidity was measured at 53% relative humidity using meters. It should be noted that this data correlates to the day time relative humidity stated by a meteorological station at an airport less than 1 km away from the test location. Upon installation of the panel, the trailer was sealed and allowed to equilibrate over night.

Upon opening the trailer the following morning, a thermographic scan of the panel was taken using a FLIR ThermaCAM® B2 infrared camera. It should be noted that the warm side air was considered to be stagnant as the heater was not operating and no mechanical ventilation was provided.

The surface temperature of the interior fabric (warm side) was measured as shown in Table 1 below:

TABLE 1

| Location | Temperature |
| --- | --- |
| Lower Left Panel Corner | +11° C. (52° F.) |
| Lower Right Panel Corner | +12° C. (54° F.) |
| Upper Left Panel Corner | +16° C. (61° F.) |
| Upper Right Panel Corner | +13° C. (55° F.) |
| Center of Panel | +18° C. (65° F.) |

Based on a Psychrometric chart, the dew point of air at 53% Relative Humidity (RH) and 18° C. (64° F.) is approximately 9° C. (48° F.).

The foregoing test method provided a realistic view of the performance of the present invention membrane structure under actual environmental conditions. The fact that no mechanical ventilation was used allowed for the development of dead air locations at the perimeter of the panel. This would represent the "worst case" scenario for the present invention membrane structure in actual use. If a mechanical ventilation system provided improved air movement across the underside of a roof comprising the present invention membrane structure, it is believed that a higher temperature profile across the interior roof surface would result.

Thus, in use in an environment having approximately 50% RH at 21° C. (70° F.), a roof panel system comprising the present invention membrane structure should provide an effective thermal blanket for the building while significantly reducing or eliminating condensation on the interior fabric surface.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. An architectural membrane structure comprising:
   an interior membrane layer having a first inner surface;
   an exterior membrane layer having a second inner surface;
   a plurality of insulation blankets comprising an aerogel material, each of the plurality of insulation blankets comprises an edge and is disposed between the first inner surface of the interior membrane layer and the second inner surface of the exterior membrane layer;
   a first heat shield arranged adjacent to the edge of each of the plurality of insulation blankets;
   a second heat shield arranged between the plurality of insulation blankets and the exterior membrane layer;
   an edge enclosure partially encloses the first heat shield, the second heat shield and the plurality of insulation blankets;
   an anchoring strip arranged between the plurality of insulation blankets and the exterior membrane layer;
   a third heat shield arranged between the anchoring strip and the exterior membrane layer;
   a retainer strip arranged between the plurality of insulation blankets and the second heat shield and partially encloses the second heat shield, the edge enclosure, the anchoring strip, and the third heat shield;
   at least one fastener disposed through the retainer strip, the third heat shield, the anchoring strip, the edge enclosure, the second heat shield and the plurality of insulation blankets; and,
   a vapor barrier deposited on one of the first and second inner surfaces.

2. The architectural membrane structure of claim 1, wherein the first and second heat shields are integral.

3. The architectural membrane structure of claim 1, wherein the combination of the exterior membrane layer, the anchoring strip and the interior membrane layer form an edge seal.

4. The architectural membrane structure of claim 3, wherein a terminal end of the edge seal distal from the plurality of insulation blankets comprises a cord or a cable.

5. The architectural membrane structure of claim 1, wherein the vapor barrier comprises a coating selected from the group consisting of: fluorinated ethylene propylene, polyethylene, perfluoroalkoxy copolymer resin, polyimide, polyvinylidene chloride, polychlorotrifluoroethylene, polyvinylidene fluoride, polyvinyl fluoride and ethylene tetrafluoroethylene and combinations thereof.

6. The architectural membrane structure of claim 5, wherein the coating has a thickness of at least five mil.

* * * * *